Patented June 7, 1938

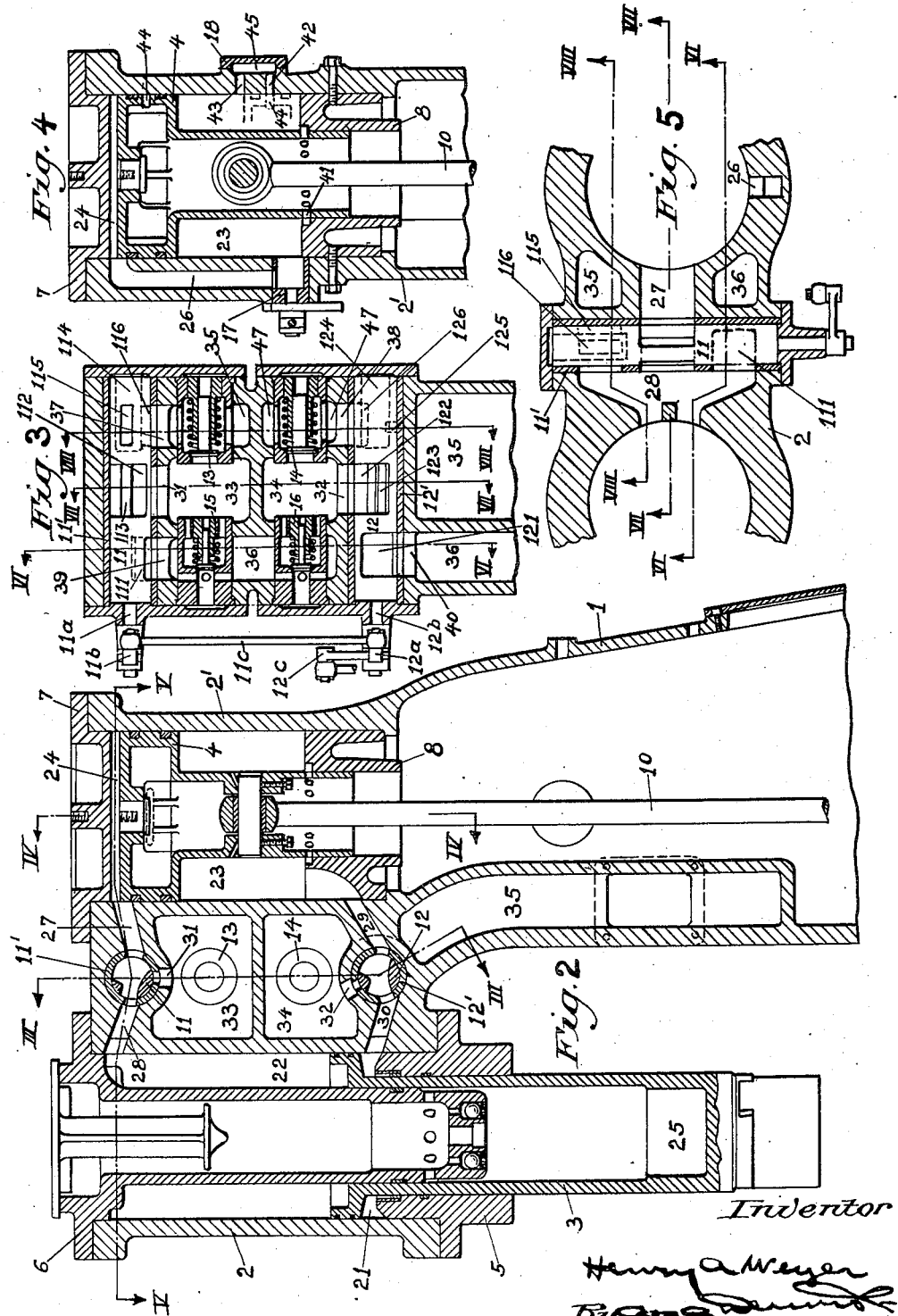

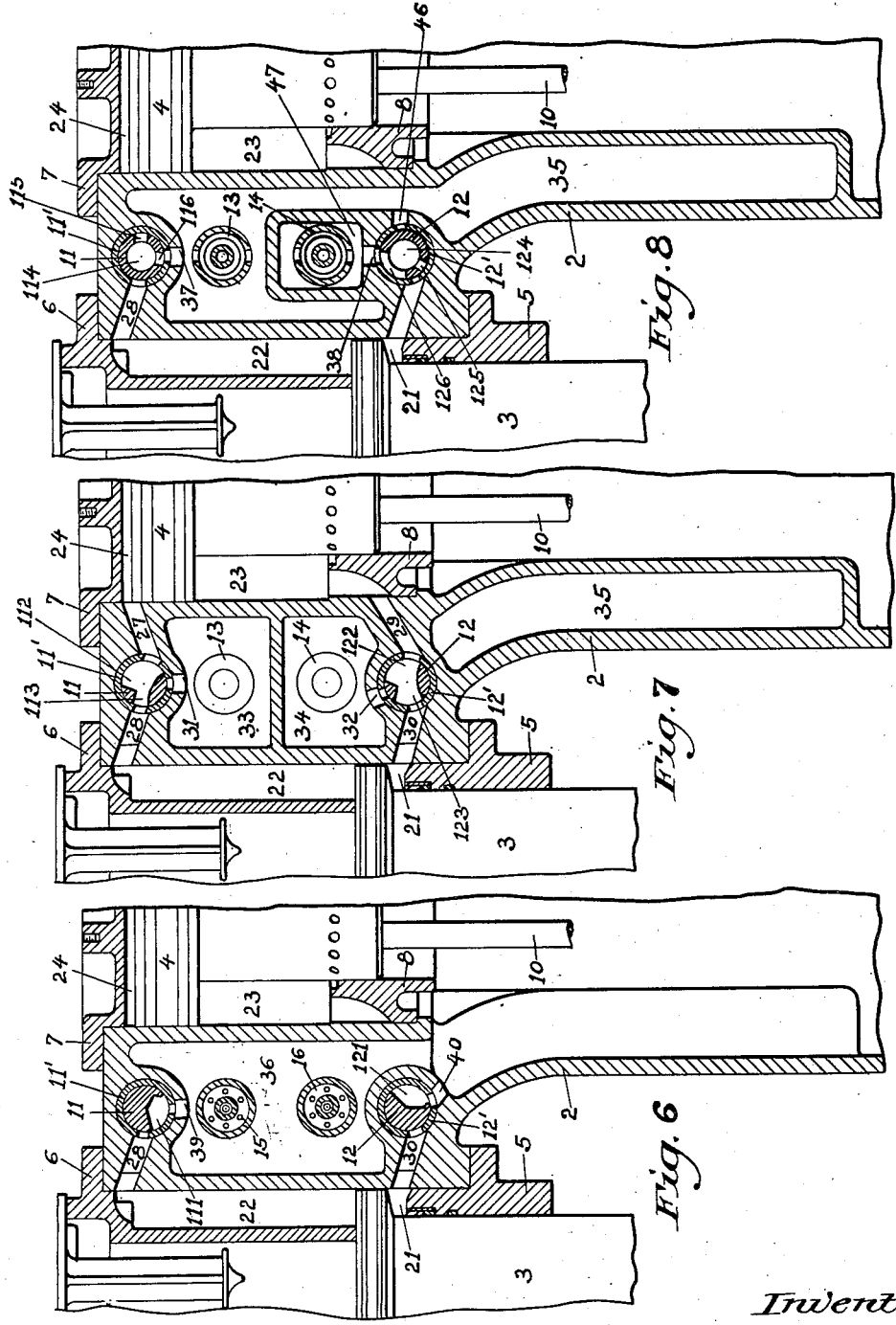

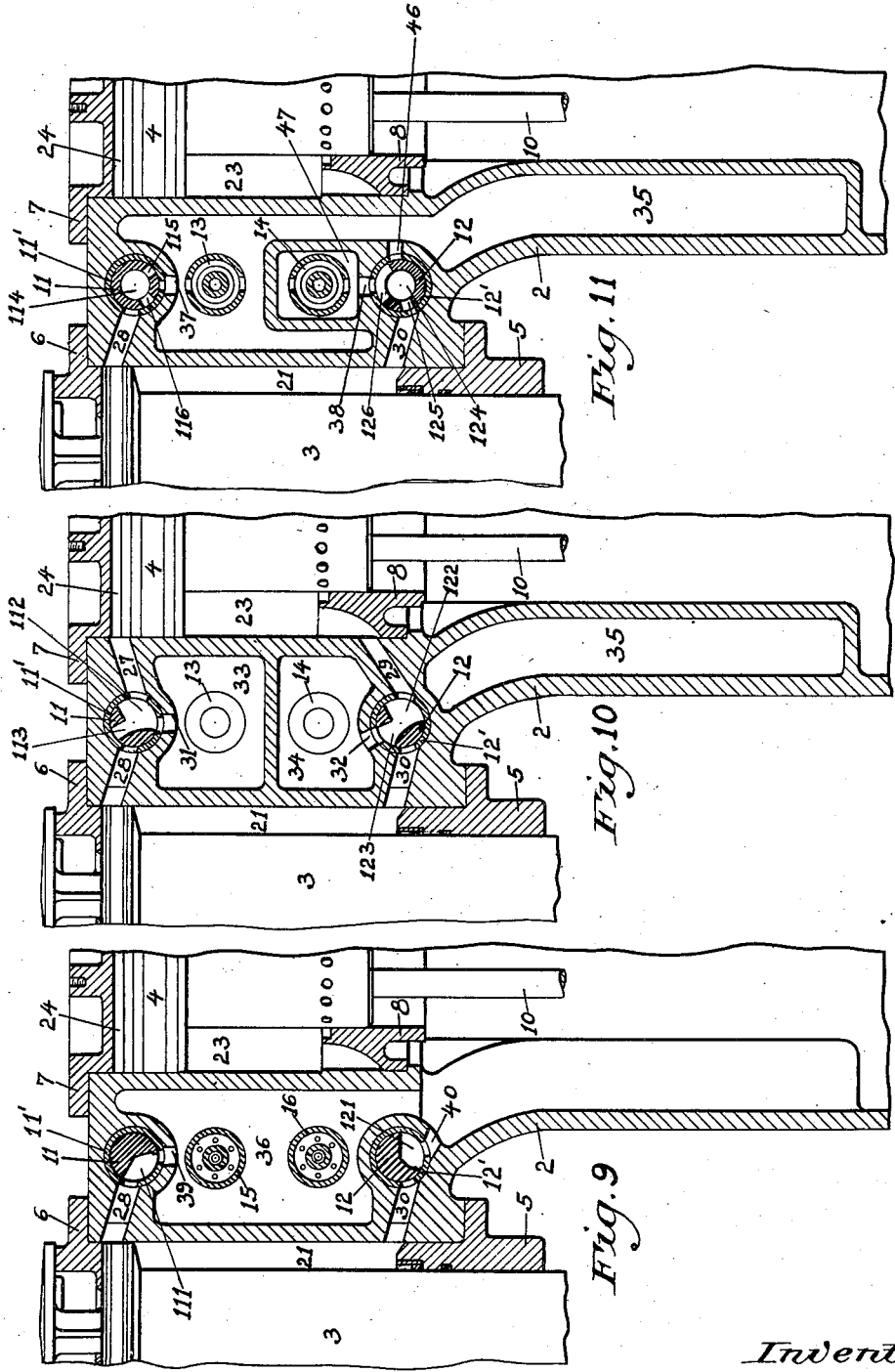

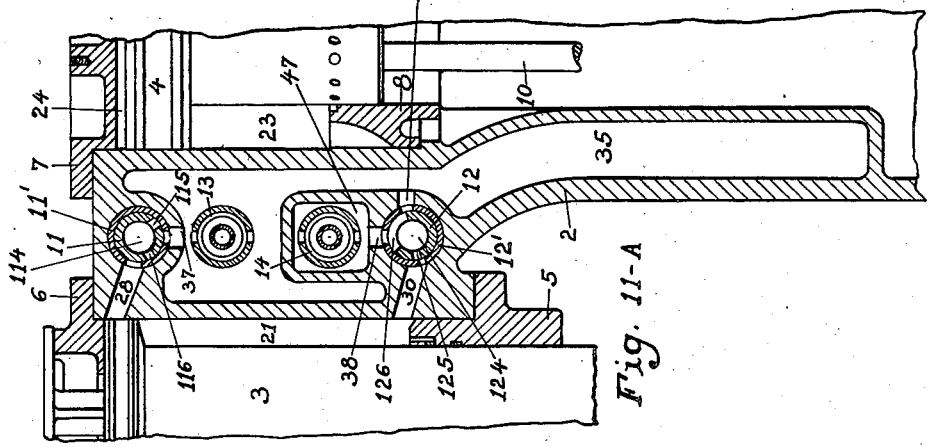
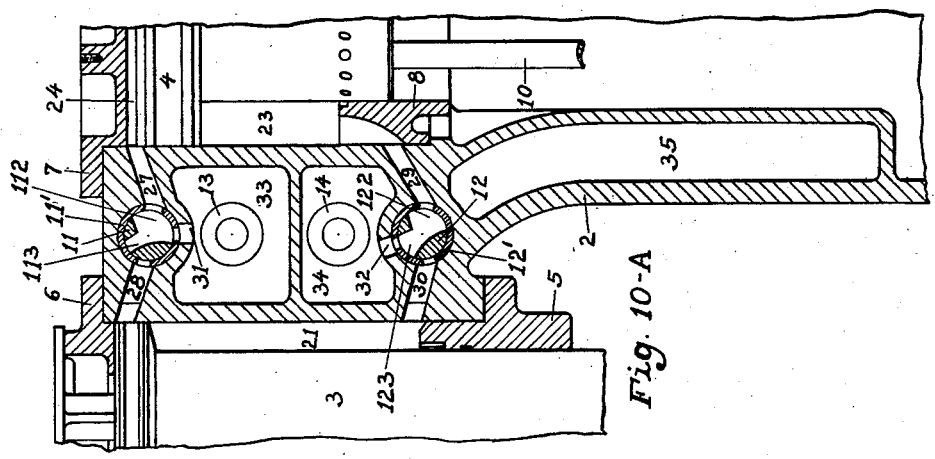
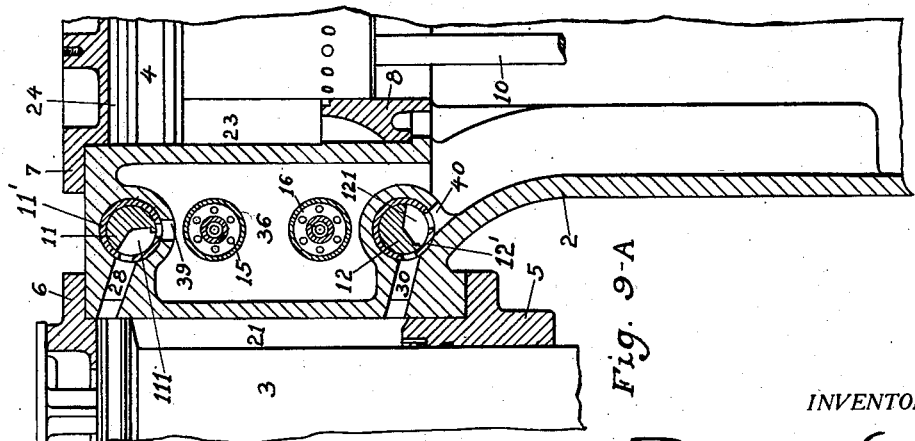

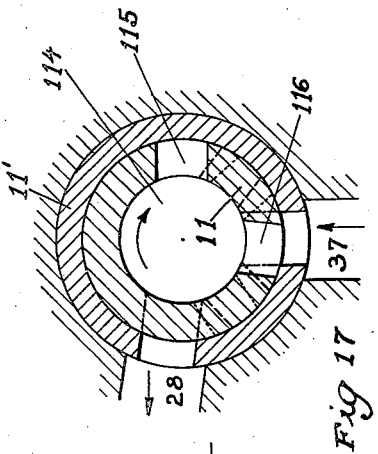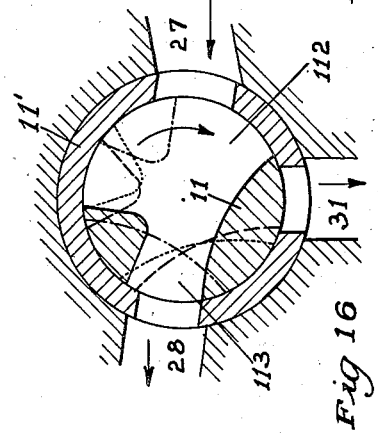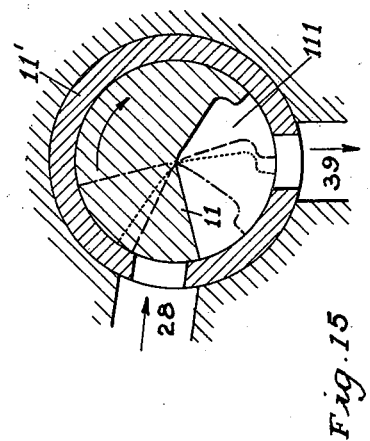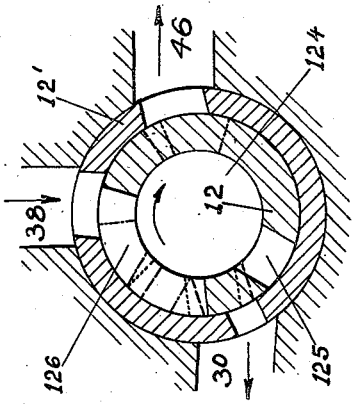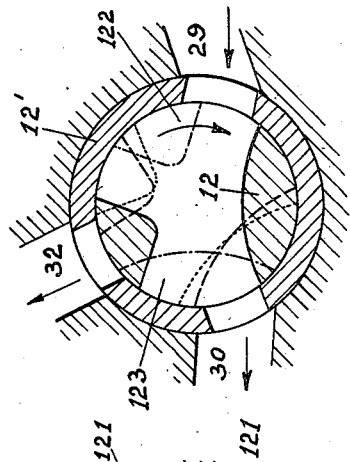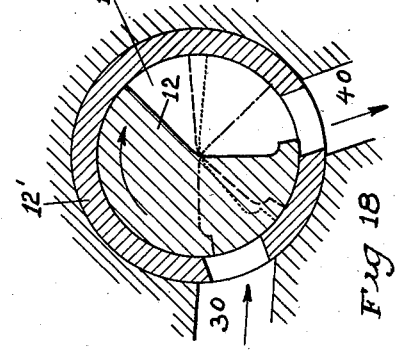

2,119,975

UNITED STATES PATENT OFFICE 2,119,975

FLUID PRESSURE HAMMER

Henry A. Weyer, Philadelphia, Pa., assignor to Beatrice S. Nazel, Philadelphia, Pa.

Application August 26, 1936, Serial No. 98,105

12 Claims. (Cl. 60—62)

My invention is an improved air hammer in which useful work is performed by both the up-stroke and the down-stroke of the power piston.

By my improvements, the ram may be held in a suspended position for positioning work on an anvil and then caused to strike a single vising blow of any desired force or to strike a continuous succession of repeated blows of any desired force. Thus either type of blow may be struck without subjecting the work to the other type of blow or the work may be subjected to both types of blows in any desired sequence.

The position and operation of the ram are preferably controlled by a pair of cylindrical valves journalled in horizontal seats spaced above one another between the power piston cylinder and ram cylinder and disposed normal to a plane common to the axes of such cylinders. The valves contain simple ports establishing or barring communication between several passages by which air is admitted to or evacuated from above or below the ram head and to and from a pressure reservoir. Such pressure reservoir is filled, through suitable spring pressed valves, with compressed air by the up-stroke and by the down-stroke of the power piston when the valves are positioned for either the single vising stroke or for suspending the ram in preparation for a vising stroke and by the up-stroke of the power piston when the valves are positioned for suspending the ram in preparation for repeated stroke operations. Compressed air from the reservoir is admitted below the ram head for suspending the ram prior to single blow vising operation, which latter is caused by the admission of compressed air from the reservoir above the ram head.

The ram is held suspended prior to repeated or full blow operation by the discharge of air from beneath the power piston in the down-stroke thereof into the ram cylinder below the ram head. In the continuous blow operation, air is discharged below the ram head from beneath the power piston on the down-stroke thereof and is discharged above the ram head from above the power piston on the up-stroke thereof.

The running control valves may be rendered inoperative and power economized by a starting control valve permitting the by-passing of air directly from one end of the piston to the other to permit the driving motor and power piston to attain operating speeds before the load of lifting or operating the ram is imposed thereon.

Further characteristics and advantages of my improvements will appear from the following description and the accompanying drawings in illustration thereof.

Figure 1:
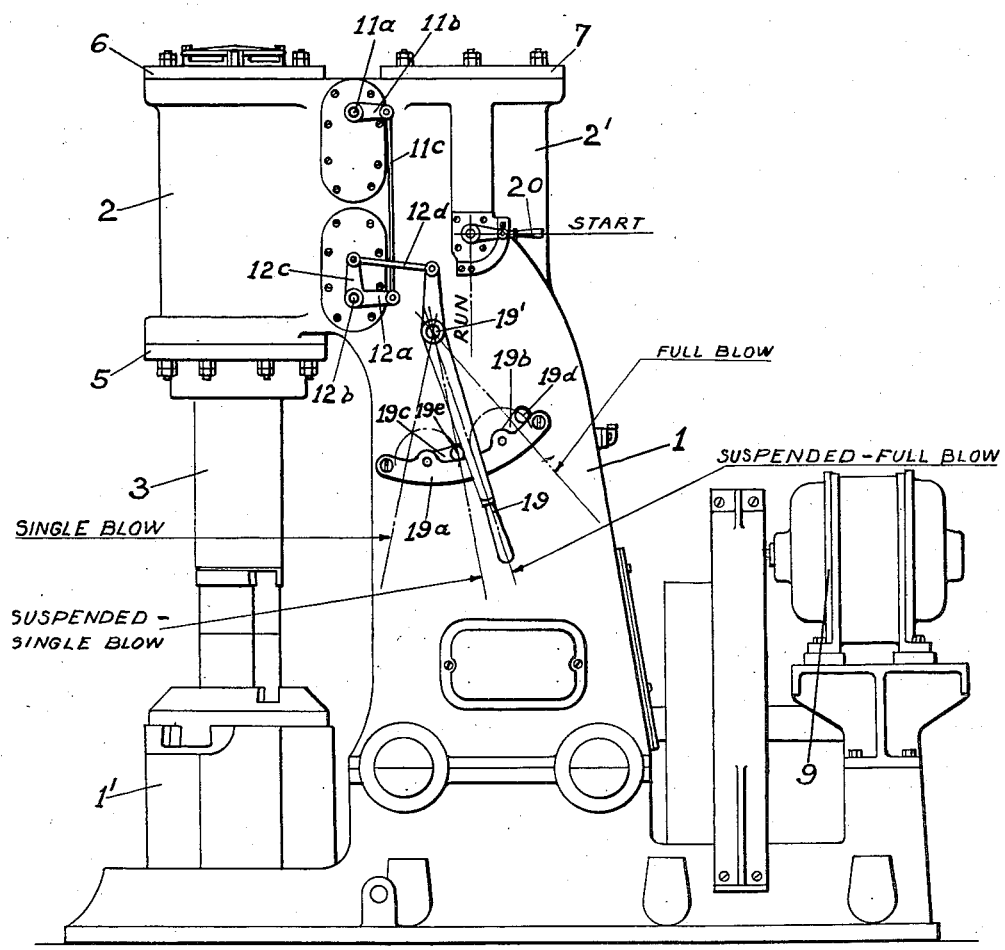
Figure 14:
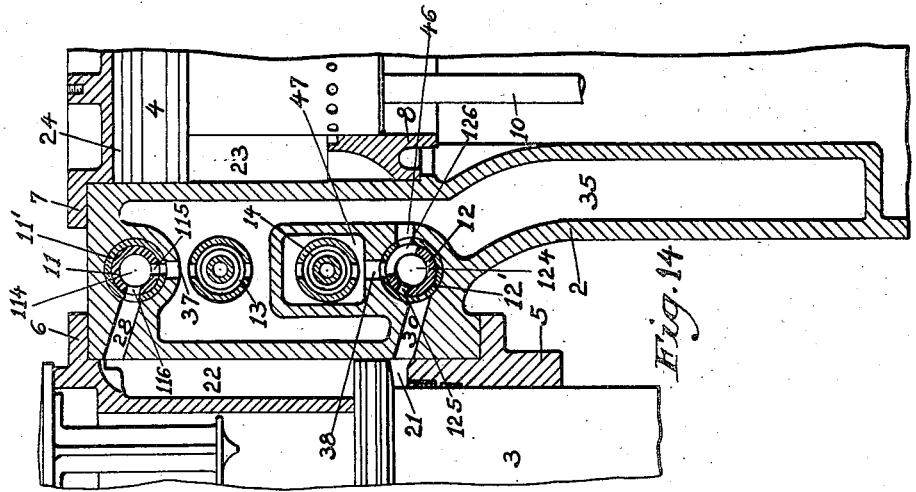
Figure 13:
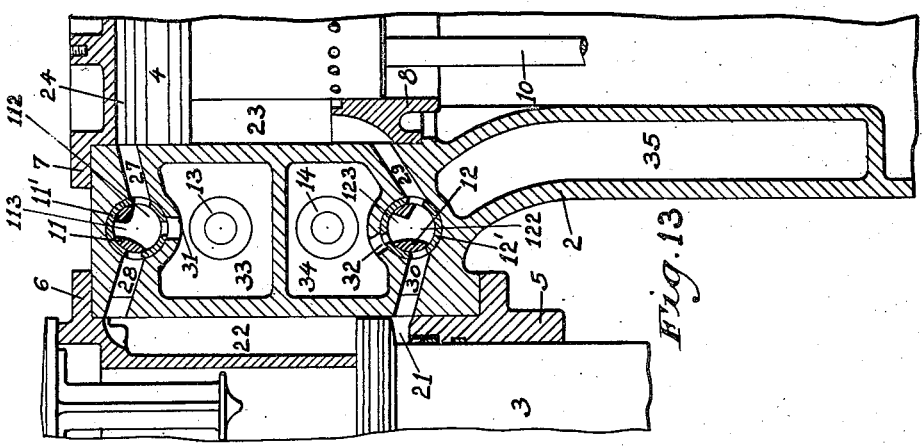
Figure 12:
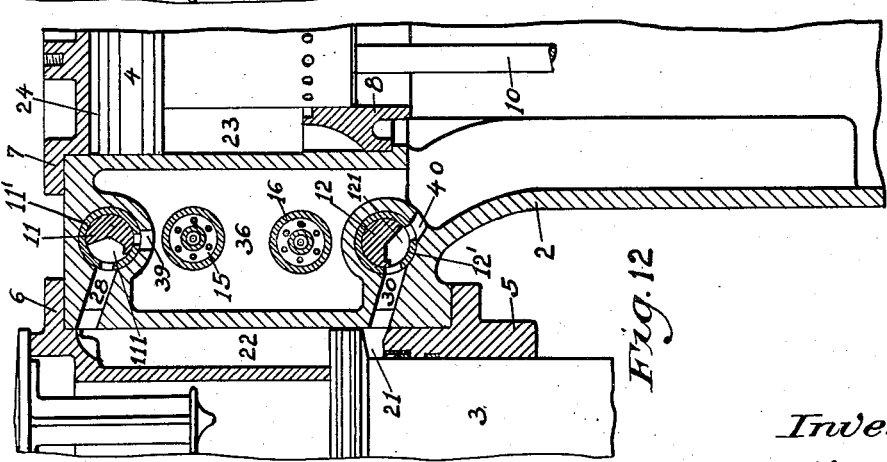

In the drawings, Fig. 1 is a side elevation of a hammer embodying my invention and indicating the several positions of the "starting control lever" and of the "running control lever"; Fig. 2 is an enlarged vertical sectional view taken on substantially the longitudinal center line of the upper part of the hammer shown in Fig. 1, with the valves in "self-acting" or "full blow" position for effecting the continuous reciprocation of the ram with the reciprocation of the power piston; Fig. 3 is a transverse vertical sectional view taken on the line III—III of Fig. 2; Fig. 4 is a vertical transverse sectional view taken on the line IV—IV of Fig. 2; Fig. 5 is a fragmentary horizontal sectional view taken through the upper valve and adjacent parts on the line V—V of Fig. 2; Figs. 6, 7 and 8 are fragmentary longitudinal vertical sectional views showing the positions of the ports of the "running control valves" in the "full blow" position and taken respectively on the sections indicated by the lines VI—VI, VII—VII and VIII—VIII of Figs. 3 and 5; Figs. 9, 10 and 11 are fragmentary longitudinal vertical sectional views showing the position of the ports of the "running control valves" in the "ram suspended for full blow" position and taken respectively on the sections indicated by the lines VI—VI, VII—VII and VIII—VIII of Figs. 3 and 5; Figs. 9a, 10a and 11a are fragmentary longitudinal vertical sectional views showing the positions of the ports of the "running control valves" in the "ram suspended for single blow" position and taken respectively on the sections indicated by the lines VI—VI, VII—VII and VIII—VIII of Figs. 3 and 5; Figs. 12, 13, and 14 are fragmentary longitudinal vertical sectional views showing the positions of the ports of the "running control valves" in the "single blow" position and taken respectively on the sections indicated by the lines VI—VI, VII—VII and VIII—VIII of Figs. 3 and 5; Figs. 15, 16 and 17 are diagrammatic views of the upper "running control valve" taken on sections indicated by the lines VI—VI, VII—VII and VIII—VIII of Figs. 3 and 5, and co-relating the changes in the positions of the valve ports in the several operating positions of such valve; and Figs. 18, 19 and 20 are diagrammatic views of the lower "running control valve" taken on sections indicated by the lines VI—VI, VII—VII and VIII—VIII of Figs. 3 and 5; and co-relating the changes in the positions of the valve ports in the several operating positions of such valve.

In the embodiment of the invention illustrated in the drawings, a pedestal or housing 1 as provided with a ram cylinder 2, in which the head of a hollow ram 3 is reciprocable, and with a power piston cylinder 2' in which a power piston 4 is reciprocated, through a connecting rod 10 and suitable gearing, by an electric motor 9. The ends of the cylinder 2 are closed by the cylinder heads 5 and 6 and the ends of the cylinder 2' are closed by the cylinder heads 7 and 8. The cylinder head 5 carries suitable rings for making an air-tight joint with the external periphery of the ram, and the cylinder head 6 is provided with a cylindrical guide depending into the interior of the hollow ram and provided with suitable check valves and ports for coaction with the cushioning chamber 25 in the lower end of the ram.

A horizontal cylindrical valve seat 11' for the cylindrical valve 11 is disposed between and adjacent the cylinders 2 and 2' with its axis substantially normal to a vertical plane common to the cylinder axes. The valve casing 11' contains a centrally located side port (see Figs. 2, 7, 10, 10a, 13 and 16) communicating through the frame passage 27 with the chamber 24 of the cylinder 2' above the piston 4; an elongated port on the opposite side (see Figs. 6 to 17 inclusive) communicating through the frame passage 28 with the chamber 22 in the cylinder 2 above the head of the ram 3; a bottom port at one end thereof (see Figs. 6, 9, 9a, 12 and 15) communicating through a frame passage 39 with an atmospheric chamber 36; a centrally located bottom port (see Figs. 2, 7, 10, 10a, 13 and 16) communicating through a frame passage 31 with a chamber 33; and a bottom port at the end opposite the passage 39 (see Figs. 8, 11, 11a, 14 and 17), and communicating through a frame passage 37 with a reservoir or pressure chamber 35.

A horizontal cylindrical valve seat 12' for the cylindrical valve 12 is disposed between and adjacent to the bottom of the cylinders 2 and 2' below the valve seat 11' and with its axis substantially normal to a vertical plane common to the axes of the cylinders.

The valve casing 12' contains a centrally located side port (see Figs. 2, 7, 10, 10a, 13 and 19) communicating through a frame passage 29 with the chamber 23 of the cylinder 2' below the piston 4; an elongated opposite side port (see Figs. 6 to 14 inclusive, and 18 to 20 inclusive) communicating through a frame passage 30 with the chamber 21 of the cylinder 2 below the head of the ram 3; a bottom port adjacent to one end thereof (see Figs. 6, 9, 9a, 12, and 18) communicating through a frame passage 40 with atmosphere through the hollow pedestal 1; a centrally located top port (see Figs. 2, 7, 10, 10a, 13 and 19) communicating through the frame passage 32 with a chamber 34; an end port at the opposite end from the passage 40, (see Figs. 8, 11, 11a, 14 and 20), and communicating through a frame passage 38 with an auxiliary chamber 47, and an end side port (see Figs. 8, 11, 11a, 14 and 20) communicating through the frame passage 46 with the reservoir 35.

Air may be drawn from the atmospheric chamber 36 into the chambers 33 and 34 through the respective spring supported suction valves 15 and 16 (Fig. 3), and air may be expelled from the chamber 33 into the reservoir 35 through the spring pressed check valve 13, and from the chamber 34 into the auxiliary reservoir 47 through the spring pressed check valve 14.

The valve body 11 is provided with a stub shaft or stem 11a to which is fixed an arm 11b. The arm is pivotally connected through a link 11c with one arm 12a of a bell crank fixed to the shaft 12b of the valve body 12. The other arm 12c of such bell crank is pivotally connected through the link 12d with the end of the running control lever 19 fulcrumed on the pivot 19'.

The shank of the lever 19 is movable by the lever handle along a segment 19a to which is pivoted the arms 19b and 19c having thereon the stops 19d and 19e which rest on top of the segment and project into the path of movement of the lever 19. When the arm 19b is rocked toward the right, its stop 19d limits the rightward movement of the lever 19 (Fig. 1) and indicates to the operator the correct maximum full blow position of the running control lever and running control valves. When both the arms 19b and 19c are rocked toward the right, the stop 19e limits the leftward movement of the lever 19 and indicates to the operator the correct position of the lever 19 and valves 11 and 12 to effect the suspension of the ram prior to full blow actuation. When the arms 19b and 19c are rocked toward the left (as indicated by the arcuate lines Fig. 1), the stop 19d indicates to the operator the correct position of the lever 19 and valves 11 and 12 to effect the suspension of the ram prior to single blow actuation, and the stop 19e limits the leftward movement of the lever 19 and indicates to the operator the proper position of the lever 19 and valves 11 and 12 to effect the maximum single blow actuation of the ram.

The valve body 11 has adjacent to the left end (Figs. 3 and 15) thereof, a recess forming a port 111 having a peripheral opening of such width as to connect the passages 28 and 39 when the valve 19 is in either suspended for full blow position or in suspended for single blow position. The passage 28 is shut off by the uncut portion of the valve body adjacent to the port 111 when the lever 19 is in full blow position and the passage 39 is shut off by the valve body when the lever 19 is in single blow position.

The middle portion of the valve body 11 contains a recess forming ports 112 and 113 (Figs. 3, 16) through which the passage 27 communicates only with the passage 28 in the full blow position (Fig. 7) and only with the passage 31 in the suspended for full blow position (Fig. 10), in the suspended for single blow position (Fig. 10a) and in the single blow position (Fig. 13).

The right hand portion (Figs. 3, 17) of the valve body 11 contains an axial passage 114 and the radial ports 115 and 116 communicating therewith. The passage 28 communicates with the passage 37 in the single blow position only; the valve ports 115, 116 being out of registration with the passages 28 and 37 in the other positions of the lever 19. The valve body 12 has a recess adjacent to the left end thereof (Figs. 3, 18) which forms a port 121 connecting the passages 30 and 40 (Fig. 12) in the single blow position. These passages are shut off from one another by the valve body in the full blow position and both suspended blow positions.

The middle portion (Figs. 3, 19) of the valve body 12 contains a recess forming the ports 122 and 123 through which the passage 29 communicates with the passage 30 only in the full blow position (Fig. 7), and communicates with the passage 32 only in both suspended blow positions and in the single blow position (Figs. 10, 10a and 13).

The right hand end (Figs. 3, 20) of the valve body 12 contains the axial passage 124 and the radial ports 125 and 126 communicating therewith. The valve openings 124, 125 and 126 connect the passages 30 and 38 in the suspended position for full blow (Fig. 11); connect the passages 30, 38 and 46 in the suspended for single blow position (Fig. 11a); and connect the passages 38 and 46 in the single blow position. In the full blow position (Fig. 8) the ports 30, 38 and 46 are all cut off from one another by the valve body 12.

The upper and lower portions of the cylinder 2' are connected by the by-pass 26 through the cylinder wall. This by-pass 26 is controlled by a rotary valve 17 actuable by the starting control lever 20, which when moved to horizontal or "start" position moves the valve 17 to open the by-pass 26 and when moved to vertical or "run" position moves the valve 17 to close the by-pass 26.

In order that the air pressure in the chamber 23 may equal atmospheric pressure at the end of the upward stroke of the power piston 4, the hollow stem of this piston is provided with a set of peripheral apertures 41 which register with a groove in the top of the cylinder head 8 when the piston is at the top of its stroke. In order that the pressure in the chamber 24 above the piston in the cylinder 2' may equal atmospheric at the end of the down stroke of the piston 4, the wall of the cylinder 2' is provided with the apertures 42 and 43 connected by an external by-pass 45 covered by the plate 18. The piston head is provided with a radial opening 44 communicating with the hollow stem of the piston and adapted to register with the opening 42 when the piston is at the bottom of its stroke. In this position of the parts, air under atmospheric pressure may pass from the hollow pedestal through the hollow piston stem ports 44 and 42, by-pass 45 and port 43 to the space above the piston. Fresh air may thus be supplied to the cylinder 2' at each end of the stroke of the piston 4.

*Starting operation*

When starting the hammer operating motor, the ram is out of action and down on the anvil 1', the lever 19 is preferably placed in the ram suspended for full blow position, and the starting control lever 20 is placed in starting position (Fig. 1). In this position of the lever 20, the by-pass 26 is opened through the valve 17 and the piston 4 is reciprocated idly by the piston rod 10 until the motor and piston are operating at working speed. While the apparatus is working up to speed, air will pass through the by-pass 26 to and fro from one side of the piston head or to the other side thereof and will not be forced into the ram cylinder, hence the ram will continue to lie on the anvil.

*"Ram suspended for full blow position" operation*

When the motor and power piston have attained working speed, the lever 20 is thrown downward to its perpendicular running position (Fig. 1) which causes the valve 17 (Fig. 4) to close the by-pass 26.

On the upward stroke of the piston head 4, the air compressed in the chamber 24 passes (Fig. 10) through the passage 27, port 112, passage 31, chamber 33, and check valve 13 into the reservoir 35 to build up pressure therein for subsequent operations.

During the upward movement of the piston head 4 air has been sucked from atmosphere through the pedestal chamber 36, suction valve 16, chamber 34, passage 32, lower valve ports 123 and 122, and passage 29 into the chamber 23 below the piston head.

On the downward stroke of the piston air compressed thereby in the chamber 23 passes through the passage 29, lower valve ports 122, 123, passage 32, chamber 34, check valve 14, auxiliary reservoir 47, passage 38, lower valve ports 126 and 125 and passage 30 into the chamber 21 beneath the head of the ram 3 which is thereby elevated to its upper or suspended position.

During the upward movement of the ram 3, the air above its head escapes through the passage 28, upper valve port 111, passage 39, chamber 36 and pedestal to atmosphere.

During the downward movement of the piston 4, air is sucked from the atmospheric chamber 36 through the suction valve 15, chamber 33, passage 31, upper valve port 112 and passage 27 into the chamber 24 above the piston head.

It will thus be seen that each stroke of the power piston 4 performs useful work, although only the air compressed by the downward stroke of the power piston is utilized to support the ram 3. The air thus supplied is simply sufficient to hold the ram at the top of its stroke while the work is being placed or adjusted upon the anvil, or during any longer period desired.

*"Full blow position" operation*

If the lever 19 is now moved toward the right (Fig. 1), the running control valves are moved into full blow position (Figs. 6, 7 and 8) and the ram is set to be self-acting, that is, each reciprocation of the power piston causes a corresponding reciprocation of the ram.

When the handle is moved but slightly toward full blow position so as to give a succession of light blows, the passage 31 will be slightly uncovered by the port 112 to permit escape of some of the air from the passage 27 into expansion chamber 33, and the passage 28 will be slightly uncovered by the port 111 (Fig. 6) to permit the escape to atmosphere of a part of the air which is forced past the passage 31 and into the chamber 22 from the chamber 24 through the passage 27, valve ports 112, 113 and passage 28 in the upstroke of the piston 4. On the downstroke of the piston 4, part of the air from the chamber 23 will pass to the chamber 21 and part will escape through the port 123 and the partly open passage 32 into the chamber 34 and auxiliary reservoir 47 which act as expansion chambers.

In this position of the valves all of the passages are closed off from one another excepting those directly connecting the ends of the cylinders 2 and 2'. On the upward movement of the power piston 4, air compressed in the chamber 24 passes through the passage 27, upper valve ports 112 and 113 and passage 28 into the chamber 22 above the head. Coincidentally, air in the chamber 21 below the ram head is sucked through the passage 30, lower valve ports 123 and 122 and passage 29 into the chamber 23 below the power piston head. The ram is thus forced down by both pressure and suction, as well as by its own weight on the upward movement of the piston head 4. On the downward movement of the power piston 4 air compressed in the chamber 23 is forced through the passage 29, lower valve ports 122 and 123 and passage 30 into the chamber 21 beneath the ram head, and coincidentally, air in the chamber 22 above the ram head is sucked through the passage 28, upper valve ports 113, 112 and passage 27 into the chamber 24 above the power piston head. Thus the ram is lifted by both pressure and suction on the downward stroke of the power piston. The force of the blow may be varied by movement of the valves 11 and 12 by gradually shifting the lever 19 between its ram suspended for full blow position and its full blow position, and vice versa. The force of the blow can be nicely regulated from the beginning of the movement since the valves 11 and 12 have only to control the fixed pressure of air generated by each power piston stroke, and the force of the blow is not effected by the variable air pressure in the reservoir.

"Ram suspended for single blow position" operation

If instead of repeated blows on the work, a single vising blow is desired, the arms 19b and 19c are turned on their pivots as indicated by the arcuate lines in Fig. 1 and the lever 19 is shifted toward the left and positioned in abutment with the stop 19d in the shifted position thereof. This movement of the lever 19 shifts the valves 11 and 12 to the positions shown in Figs. 9a, 10a and 11a, the ram 3 meanwhile remaining suspended for the placement or adjusting of work on the anvil.

In this position of the valves air, which had been compressed in the reservoir 35 by the upward movement of the power piston 4 in the suspended for full blow position, passes (Fig. 11a) from the reservoir 35 through the passage 46, lower valve port 126, lower valve passage 124, lower valve port 125 and passage 30 into the chamber 21 beneath the ram head, and the air pressure in the reservoir 35 is maintained or supplemented by both the upward and downward movement of the power piston 4.

On the upward stroke of the power piston 4, air compressed in the chamber 24 is forced through the passage 27, upper valve port 112, passage 31, chamber 33 and check valve 13 into the reservoir 35, and on the downward stroke of the piston 4 air compressed in the chamber 23 is forced (Fig. 10a) through the passage 29, lower valve ports 122 and 123, passage 32, chamber 34, check valve 14, chamber 47 (Fig. 11a), passage 38, lower valve ports 126, passage 46 and into the reservoir 35.

Any air above the ram head escapes through the passage 28, upper valve port 111 and passage 39 and chamber 36 to atmosphere, as described in connection with the "ram suspended for full blow position" operation. In the downward movement of the power piston 4, air is sucked into the chamber 24, and in the upward movement of the power piston 4 air is sucked into the chamber 23, from the atmosphere through the suction valves 15 and 16 in the same manner as described in connection with the "ram suspended for full blow position" operation. It will, of course, be understood that the lever 19 may be moved into the "ram suspended for single blow position" from either the "ram suspended for full blow position" or from the "single blow position" of the lever 19.

"Single blow position" operation

When it is desired to apply a single blow to and apply vising pressure to the work on the anvil, the lever 19 is shifted toward the left from its position adjacent to the stop 19d. The force of the blow and vising increases as the lever 19 is moved toward the left; the maximum single blow being struck when the lever 19 is adjacent to the stop 19e when the latter is shifted to its leftward position indicated by the arcuate line in Fig. 1.

As the valves 11 and 12 are shifted toward "single blow" position, the upward and downward stroke of the power piston both pump air under pressure into the reservoir 35. More particularly on the up-stroke of the power piston 4, the air compressed in the chamber 24 is forced (Fig. 13) through the passage 27, upper valve port 112, passage 31, chamber 33, check valve 13 into the reservoir 35. On the down-stroke of the power piston 4, the air compressed in the chamber 23 is forced (Fig. 13) through the passage 29, lower valve ports 122 and 123, passage 32, chamber 34, check valve 14, chamber 47, passage 38, lower valve port 126, and passage 46 into the reservoir 35. In both the upward and downward movements of the piston 4, air is sucked from the atmospheric chamber 36 through the suction valves 15 and 16 into the chambers 24 and 23 in the same manner as described in the ram suspended positions.

The air in the chamber 21 beneath the ram head escapes (Fig. 12) through the passage 30, lower valve port 121, and passage 40 to atmosphere, and compressed air from the chamber 35 passes continuously therefrom (Fig. 14) through the passage 37, upper valve port 115, passage 114, port 116, and passage 28 into the chamber 22, thereby forcing and holding the ram down against the work on the anvil.

Having described my invention, I claim:

1. A power hammer comprising a power cylinder, a power piston therein, a ram cylinder, a ram having a head therein, an air reservoir, and means comprising valve mechanism for discharging compressed air from the power cylinder above the piston into the reservoir on the up-stroke of the power piston without reentry of such compressed air into the power cylinder and for discharging compressed air from the power cylinder below the piston into the reservoir on the down-stroke of the power piston without reentry of such compressed air into the power cylinder and for discharging compressed air from the reservoir to the ram cylinder either above or below the ram head.

2. A hammer as set forth in claim 1 having means for discharging compressed air to the reservoir and none to the ram cylinder from the power cylinder on one stroke of the power piston and to the ram cylinder beneath the ram head and none to the reservoir from the power cylinder on the opposite stroke of the power piston.

3. A power hammer comprising a power cylinder, a power piston therein, a ram cylinder, a ram having a head in said ram cylinder, an air reservoir and a plurality of rotary valves between said cylinders controlling communication between said cylinders and reservoir, said valves having axes substantially normal to a plane common to the axes of said cylinders and controlling direct communication between said cylinders and indirect communication between said cylinders through said reservoir.

4. A power hammer having a power cylinder, a power piston therein, a ram cylinder, a ram having a head in said ram cylinder, an air reservoir, and a pair of rotary valves having ports connecting said cylinders in one position thereof, connecting said power cylinder with said ram cylinder and with said reservoir in a second position thereof, connecting said power cylinder with said reservoir and said reservoir with one end of said ram cylinder in a third position thereof, and connecting said power cylinder with said reservoir and said reservoir with the other end of said ram cylinder in a fourth position thereof.

5. A power hammer comprising a power cylinder, a power piston therein, a ram cylinder, a ram having a head in said ram cylinder, a reservoir, valve mechanism controlling communication between said cylinders and between said cylinders and reservoir, and valve mechanism for rendering said first named valve mechanism ineffective by by-passing air from one end to the other of said power cylinder.

6. A power hammer comprising a power cylinder and a ram cylinder, a power piston in said power cylinder and a ram having a head in said ram cylinder, valve mechanism controlling communication between said cylinders, a valve actuator, and a pivoted arm having an actuator stop thereon movable by rocking said arm into two positions in the path of said actuator.

7. A power hammer comprising a power cylinder, a power piston therein, a ram cylinder, a ram having a head in said ram cylinder, an air reservoir, valve mechanism controlling communication between said cylinders and between said cylinders and reservoir, a valve actuator, a plurality of pivoted arms each having an actuator stop thereon movable by rocking said arms into four positions in the path of said actuator.

8. A power hammer comprising a power cylinder, a power piston therein, a ram cylinder, a ram having a head in said ram cylinder, an air reservoir, a valve seat, a rotary valve having therein ports in planes spaced axially along the axis of said valve, passage-forming means connecting said ram cylinder with said valve seat adjacent to the axial plane of each of said ports, passage-forming means connecting said valve seat adjacent to the axial plane of one of said ports with atmosphere, passage forming means connecting said power cylinder with said valve seat adjacent to the axial plane of a second of said valve ports, passage-forming means connecting the valve seat with said reservoir adjacent to the axial plane of said second valve port, passage-forming means connecting said valve seat with said reservoir adjacent to the axial plane of a third valve port, a second valve seat, a rotary valve in said second seat and having therein ports in planes spaced along the axis of said second valve, passage-forming means connecting said ram cylinder with said second valve seat adjacent to the planes of each of the ports of said second valve, passage-forming means connecting said second seat adjacent to the plane of one of said ports with atmosphere, passage-forming means connecting said power cylinder with said valve seat adjacent to the plane of a second port of said second valve, passage-forming means connecting said second seat adjacent to the plane of said second port of the second named valve with said seat adjacent to the plane of a third port in the second named valve, and passage-forming means connecting said reservoir with said second valve seat adjacent to the plane of said third port of said second valve.

9. A power hammer comprising a power cylinder, a power piston in said power cylinder, a ram cylinder, a ram having a head in said ram cylinder, a pressure reservoir, valve mechanism controlling communication between said cylinders and between said cylinders and reservoir, and means for actuating said valve mechanism from an intermediate position to either a position producing repeated blows of said ram or to a position producing a single blow of said ram.

10. A power hammer comprising a power cylinder, a power piston therein, a ram cylinder, a ram having a head in said ram cylinder, a pressure reservoir, valve mechanism having intermediate positions in one of which said ram is suspended by air pumped directly from said power piston and in the other of which said ram is suspended by air supplied from said pressure reservoir, said valve mechanism having a position at one side of said intermediate positions and admitting air on opposite sides of said ram head on each stroke of said power piston, and said valve mechanism having a position on the other side of said intermediate positions and admitting air to only one side of said ram head from said pressure reservoir.

11. A power hammer comprising a power cylinder, a power piston reciprocable therein and forming therewith chambers above and below the piston, a ram cylinder, a ram having a head reciprocable in said ram cylinder, a pressure reservoir, and means through which said chambers communicate with said ram cylinder and with said reservoir and including chambers having predetermined ratios to said first named chambers for limiting the pressure to which said pressure reservoir is subjected.

12. A power hammer comprising a power cylinder, a power piston reciprocable therein, a ram cylinder, a ram having a head reciprocable in said ram cylinder, means through which said cylinders communicate and including an expansion chamber for limiting the pressure of air forced from the said power cylinder to said ram cylinder in striking a light blow.

HENRY A. WEYER.